3,551,359
PROCESS OF GELLING, FOAMING, AND VUL-
CANIZING A BLEND OF HIGH SOLIDS SYN-
THETIC LATICES
Colin P. Mason, Sarnia, Ontario, Canada, assignor to
Polymer Corporation Limited, Sarnia, Ontario, Can-
ada, a body corporate
No Drawing. Filed Mar. 28, 1967, Ser. No. 626,390
Claims priority, application Canada, Apr. 30, 1966,
959,254
Int. Cl. C08j 1/16; C08d 7/00
U.S. Cl. 260—2.5                          6 Claims

ABSTRACT OF THE DISCLOSURE

A high solids latex blend of natural rubber latex or synthetic rubber latex with a butadiene/alkyl-substituted acrylonitrile latex is claimed. The blend is suitable for the production of improved latex films and foam rubber goods.

---

This invention relates to compositions arising from blends of latices. More particularly, it relates to a blend of a rubber latex with a latex of an elastomeric, nitrile-containing copolymer of a conjugated diolefin.

Elastomeric polymers in the form of concentrated aqueous dispersions of microscopic particles provide a unique material from which to manufacture compositions such as foam rubber, dipped goods and coatings. Synthetic rubber latex is, however, lacking in certain desired characteristics such as "wet gel strength" and the tensile strength of latex films. Natural rubber latex on the other hand is lacking in resistance to organic solvents.

It is an object of this invention to improve the deficient properties of synthetic rubber latex. A further object is to provide a latex composition based on synthetic latices having improved properties. Yet another object of the invention is to prepare rubber products, based on synthetic rubber latices, having improved properties.

It has now been discovered that a composition of synthetic rubber latex of improved properties may be obtained by blending (1) a rubber latex, e.g., a butadiene/styrene rubber latex, with (2) a latex of a copolymer of a conjugated alkadiene and an alkyl-substituted olefini-cally-unsaturated nitrile comonomer, e.g., a butadiene/methacrylonitrile rubber latex. Such a discovery is surprising since conventional butadiene/acrylonitrile copolymer rubber latex adds little, if anything, to properties such as wet gel strength in foam rubber or tensile strength in latex films prepared from comparable blends.

The objects of this invention have been achieved in providing an aqueous dispersion of a rubber which comprises a latex blend of (A) a rubber latex with (B) a latex of a copolymer of 50 to 90 weight percent conjugated alkadiene having 4 to 8 carbon atoms and an olefinically-unsaturated nitrile comonomer having an alkyl-substituent of 1 to 2 carbon atoms. In one of its specific aspects, the invention has been achieved in providing an aqueous dispersion of a synthetic rubber which comprises a latex blend of (A) a butadiene/styrene rubber latex (containing at least 60% by weight of rubber hydrocarbon solids) and (B) a butadiene/methacrylonitrile copolymer latex, said copolymer containing about 25 to 45 weight percent of methacrylonitrile; the copolymer in latex (B) comprising a major proportion by weight of the total polymer in the blend of polymers (A) and (B).

A further object of the invention has been achieved in providing a process of producing a shaped elastic composition which comprises blending (A) a rubber latex having at least 60% by weight rubber solids content with (B) a latex of a copolymer of 50 to 90 weight percent conjugated alkadiene having 4 to 8 carbon atoms and an olefinically-unsaturated nitrile comonomer having an alkyl-substituent of 1 to 2 carbon atoms, the blend of (A) and (B) having at least 58 weight percent rubber solids and being pourable; shaping the blend to a predetermined form, gelling and vulcanizing.

The composition according to this invention consists of two essential components. The first component (A) is a rubber latex. The term "rubber latex" as used herein is defined as meaning a synthetic latex of an essentially hydrocarbon rubber polymerizate containing the elements C and H without or with the element N; hydrocarbon rubber latex of natural origin may also be included within the definition. It is preferred to use a latex of a homopolymer or copolymer of a conjugated alkadiene having 4 to 8 carbon atoms. Such alkadiene includes butadiene-1,3, isoprene and 2,3-dimethyl butadiene-1,3. Mixtures of such alkadienes may be used, as may mixtures of an alkadiene with suitable comonomer(s) such as styrene and acrylonitrile, provided the comonomer constitutes less than 50 percent by weight of the monomer mixture.

The preparation of synthetic rubber latices is well known in the art. They are preferably prepared by emulsion polymerization of dispersed monomers in an aqueous solution containing an emulsifier such as soap, an initiator such as a persulphate or organic peroxide and a chain-transfer agent such as a mercaptan. Another method of preparation is to dissolve solid rubber in hydrocarbon solvent and disperse this solution in aqueous soap solutions, strip off the solvent and evaporate excess of water. Such preparations are known in the art and are not the subject of this invention.

Where natural Hevea latex is used as component (A), the commercially available high solids (i.e., containing greater than 60% total latex solids) natural latex may be used, although additional emulsifier such as potassium oleate should usually be added to the blend with component (B) to enhance stability.

The synthetic rubber latex preferably used in this invention is one having an average particle size of at least 1000 angstroms, more preferably not less than 1500 angstroms. It may be produced by agglomerating a conventional small-particle-size latex using known techniques, such as freeze-thaw agglomeration process, or a restricted-orifice process. Concentration of the agglomerated latex may then be accomplished by evaporation until a solids content of at least 60% by weight is achieved.

The second component (B) according to this invention is a latex of a copolymer of 50 to 90 weight percent conjugated alkadiene having 4 to 8 carbon atoms and an olefinically-unsaturated nitrile monomer having an alkyl-substituent of 1 to 2 carbon atoms. The alkadiene is as defined for component (A) hereinbefore. The olefinically-unsaturated nitrile monomer is preferably a nitrile of an $\alpha, \beta$-unsaturated alkyl substituted carboxylic acid and is copolymerizable with said alkadiene. The alkyl-substituent contains 1 to 2 carbon atoms. Examples of such monomers are methacrylonitrile and ethacrylonitrile. Proportions of 10 to 50 weight percent nitrile monomer are useful in the copolymer of component (B) but the preferred range is 25 to 45 weight percent. The molecular weight of the nitrile copolymer is not critical and may vary within the Mooney viscosities (ML–4 at 100° C.) of about 20 up to 150, although good results are to be found in the Mooney range of 50 to 75. The nitrile copolymer of component (B) is prepared by emulsion copolymerization of the alkadiene and nitrile monomers in conventional processes of the polymerization art and such details are not the subject of this invention. The total latex solids should be high enough that when blended with latex (A), the resulting total latex solids of the blend is at least 58% by weight.

The two components (A) and (B) of the blend of this inventon may be admixed in various proportions depending upon the improvement desired and the article to be manufactured. However, blends containing a major proportion of the nitrile latex copolymer are preferred, especially where oil resistance is essential. Suitable blends contain 90 to 55 percent by weight of the nitrile copolymer latex solids.

The above latex blends may be used without the addition of any extraneous materials. Gelation or fusing of particles may be achieved by drying the blend at room or elevated temperatures. Cross-linking may be induced by irradiation with gamma rays, X-rays or by heat treatment in the presence of air. However, for most applications, it is preferred to mix into the latex blend various compounding ingredients which improve the processing or properties of the final product. These ingredients normally include stabilizers, thickeners, curatives, antioxidants and fillers such as are well known in the art of latex compounding. Such ingredients are preferably added in the form of aqueous dispersions, the latex blend thoroughly mixed and then usually matured a room temperature for ½ hour to 24 hours before use. The compounded and matured latex may then be shaped to a predetermined form before it is gelled. The methods of shaping, gelling and curing may vary depending on the final product which may de dipped goods of foam goods. In the production of dipped goods, the latex composition is deposited on a support having a predetermined shape, then gelled by dipping in a coagulant and cured. In the production of latex foam goods, the compounded latex composition is first whipped to a uniform foam, then treated with a delayed action gelling agent, shaped and gelled so that the shape is retained; the gelled structure is then cured, washed and dried to produce a latex foam structure having a density usually of 0.05 to 0.3, suitably 0.1 gram per cubic centimeter.

A critical stage in the production of such goods is the gel stage, in that such gel structure should have adequate strength to be mechanically handled. The composition of this invention is characterized by a wet gel strength that is much higher than that of other synthetic rubber lattices. The cured film and foam goods also have improved tensile strength.

The invention is illustrated by the following examples.

EXAMPLE I

Lattices used for control or comparison purposes were obtained and are described as follows:

(i) A synthetic latex (referred hereafter as B–S) was prepared in a conventional emulsion polymerization at 12° C. in fatty-acid soap solution using monomers butadiene-1,3 and styrene in the ratio of 73/27, the latex concentrated to a solids content of 66%; other properties of the latex were: pH of 10.3, average particle size of 1600 angstroms, and Mooney viscosity of the contained polymer of 150 (ML–4 at 100° C.);

(ii) A synthetic latex blend of latex B–S in the ratio shown in Table I with a synthetic latex (referred hereafter as B–A) prepared in a conventional emulsion polymerization at 12° C. in fatty-acid soap solution using monomers butadiene-1,3 and acrylonitrile to give a content of acrylonitrile units in the polymer of 35 weight percent, a pH of 10.3, a Mooney viscosity of the contained polymer of 125 (ML–4 at 100° C.) and a latex solids content of 64%.

In contrast to these control latices, there was prepared a latex blend of this invention of 75 parts by weight of total latex solids of latex M–1 described hereinafter, with 25 parts by weight of total latex solids of the synthetic butadiene/styrene latex above referred to as latex B–S.

Latex M–1 was prepared in a conventional nitrile-rubber emulsion polymerization using 60/40 ratio of butadiene/methacrylonitrile monomers, using potassium oleate emulsifier, potassium persulfate initiator and t - dodecyl mercaptan as molecular weight modifier. The polymerization was conducted at 37° C. and carried to 80% conversion. Agglomeration and concentration then yielded a latex having a viscosity of 12 poise at 25° C. (as measured in a Brookfield LVF viscometer using #3 spindle at 30 r.p.m.) and 60% latex solids. The blend of latex B–S and the latex of copolymer of butadiene-1,3/methacrylonitrile was prepared by mixing the two latices at room temperature with agitation for 30 minutes. Foam rubber compositions were then prepared by compounding the latex blend in the following recipe expressed in parts of active material per 100 parts by weight of total latex solids:

Zinc diethyl dithiocarbamate _____ 1.25
Zinc salt of 2-mercaptobenzothiazole _____ 1.0
Sulfur _____ 2.0
2,2-methylene bis (4-methyl 6-tert. butyl phenol) ___ 1.25
Trimene base (trade name for a reaction product of
  ethyl chloride, formaldehyde and ammonia) ____ 0.5

The above compounding ingredients (added in the form of aqueous dispersions) were intimately mixed with the latex blend and the compound allowed to mature for 16 hours at 25° C. in a covered vessel. The resulting compound was then whipped in an internal mixer with a wire cage whip to about 10 times its volume to give latex foam of desired density, i.e. about 0.1 gram per cubic centimeter.

The foamed composition was then treated with 3.0 parts of zinc oxide, 0.7 part of Trimene base and 1.9 parts of sodium silicofluoride and further whipped for 2 minutes. The compositions were then poured into a mould measuring 20 x 15 x 2.5 centimeters, covered with a lid and allowed to gel at room temperature for 6 minutes, followed by curing at 100° C. for 35 minutes. The cured latex foam was then removed from the mould, washed with water, dried at 82° C. for 1¾ hours and then tested for tensile strength. Samples of the uncured wet gel were also tested for tensile strength.

Cast latext films were also prepared from the compounded latex blends using polytetrafluoroethylene plates and a cure time of 30 minutes at 110° C.

The data for these evaluations are shown in Table I and reveal the marked improvement of the composition of this invention.

TABLE I

| | Butadiene-styrene synthetic latex (B–S) control | Control latex blend, butadiene/acrylonitrile latex (B–A) with butadiene/styrene latex (B–S) | Experimental latex blend of: butadiene/methacrylonitrile latex (M–1) with butadiene/styrene latex (B–S) |
|---|---|---|---|
| Proportion of blend (parts by weight total latex solid) | 100 | 77/23 | 75/25 |
| Foam rubber* properties: | | | |
| Wet gel strength (grams per square centimeter) | 77 | 105 | 151 |
| Cured tensile strength (grams per square centimeter) | 414 | 507 | 776 |
| Latex film properties: | | | |
| Tensile strength (kilograms per square centimeter) | 25.6 | 27.4 | 67.8 |
| Elongation, percent | 400 | 310 | 410 |

*Density of 0.1 gram/cm.³.

EXAMPLE II

The butadiene/methacrylonitrile latex M-1 of Example I was used to prepare further blends with latex B-S. Comparable blends were also prepared from the conventional butadiene/acrylonitrile latex B-A with latex B-S. Three pairs of blends were examined, each pair having been prepared to contain equivalent nitrile content per 100 parts polymer in both control and experimental blend, over the range 0.51 to 0.39 equivalent part nitrile.

As in Example I, latex foam rubber specimens were prepared and tested as were cast latex films. The results of this experiment are shown in Table II and show the superiority of blends prepared according to this invention.

EXAMPLE IV

Latex $M_2$ of Example III was further used to prepare a blend with a high solids natural latex of 65% total latex solids. For comparison, a control blend was made from latex B-A of Example I also with natural latex. The ratio of blending was such as to give equivalent part nitrile of 0.37 in each case. After blending, 0.5 part of potassium oleate was added, the latex blend compounded as in Example I except that an additional 0.7 part potassium oleate was added at the foaming stage.

In foam rubber compositions prepared from these blends, the superiority of the composition prepared from the latex blend of this invention is noted from the data listed in Table IV.

TABLE II

| | Parts by weight total latex solids | | | | | |
|---|---|---|---|---|---|---|
| | Experimental | Control | Experimental | Control | Experimental | Control |
| Latices in blend: | | | | | | |
| Butadiene/methacrylonitrile latex (M-1) | 85 | | 75 | | 65 | |
| Butadiene/styrene latex (B-S) | 15 | 23 | 25 | 32 | 35 | 41 |
| Butadiene/acrylonitrile latex (B-A) | | 77 | | 68 | | 59 |
| Equivalent parts nitrile per 100 parts polymer in blend | 0.51 | 0.51 | 0.45 | 0.45 | 0.39 | 0.39 |
| Foam rubber* properties: | | | | | | |
| Wet gel strength (grams per square centimeter) | 144 | 105 | 151 | 109 | 137 | 112 |
| Cured tensile strength (grams per square centimeter) | 838 | 507 | 776 | 470 | 727 | 506 |
| Latex film properties: | | | | | | |
| Tensile strength (kilograms per square centimeter) | 73.8 | 27.4 | 67.8 | 19.3 | 48.5 | 21.6 |
| Elongation, percent | 420 | 310 | 410 | 200 | 400 | 290 |

*Density of 0.1 gram/cm.³

EXAMPLE III

A second butadiene/methacrylonitrile latex ($M_2$) was prepared as in Example I but employing a different monomer ratio, namely 65 butadiene-1,3 to 35 methacrylonitrile. An experimental latex blend was then made using latex $M_2$ with a polybutadiene latex (PB) prepared in emulsion polymerization at 12° C., using potassium oleate emulsifier and t-dodecyl mercaptan. The conversion was taken to 75%. After agglomeration and concentration, the resulting latex (PB) had a solids content of 60% by weight and a pH of 10.5.

As a reference control, a latex blend using latex B-A with latex PB was also prepared.

In both the experimental and control blends, the ratio of latices in each blend was such as to give 0.37 equivalent part nitrile per 100 parts polymer.

Examination of foam rubber properties again confirmed the improved tensile strength in both the wet gel and cured foam of samples prepared according to this invention, as shown in Table III.

TABLE III

| | Parts by weight total latex solids | |
|---|---|---|
| | Experimental | Control |
| Latices in blend: | | |
| Butadiene/methacrylonitrile latex ($M_2$) | 70 | |
| Polybutadiene latex (PB) | 30 | 45 |
| Butadiene/acrylonitrile latex (B-A) | | 55 |
| Equivalent parts nitrile per 100 parts polymer in blend | 0.37 | 0.37 |
| Foam rubber* properties: | | |
| Wet gel strength (grams per square centimeter) | 147 | 109 |
| Cured tensile strength (grams per square centimeter) | 614 | 357 |

*Density 0.1 gram per cm.³

TABLE IV

| | Parts by weight total latex solids | |
|---|---|---|
| | Experimental | Control |
| Latices in blend: | | |
| Butadiene/methacrylonitrile latex ($M_2$) | 70 | |
| Natural latex | 30 | 45 |
| Butadiene/acrylonitrile latex (B-A) | | 55 |
| Equivalent parts nitrile per 100 parts polymer in blend | 0.37 | 0.37 |
| Foam rubber* properties: | | |
| Wet gel strength (grams per square centimeter) | 168 | 114 |
| Cured tensile strength (grams per square centimeter) | 590 | 502 |

*Density 0.1 gram per cm.³

What is claimed is:

1. A process for the production of shaped elastic compositions which comprises compounding, shaping, gelling and vulcanizing high solids rubber latex of at least 58 percent by weight total latex solids and comprising a blend of (A) a synthetic latex of a rubbery hydrocarbon polymer selected from homopolymers of conjugated alkadienes having 4-8 carbon atoms and copolymers of said alkadienes with styrene and having a solids content of at least 60 percent by weight and (B) a latex of a copolymer of from 50 to 90 percent by weight of a conjugated aliphatic diene of from 4 to 8 carbon atoms and from 50 to 10 percent by weight of an acrylic nitrile having an alkyl substituent of 1 to 2 carbon atoms, the copolymer in latex (B) comprising a major proportion by weight of the total polymer in the blend of polymers (A) and (B).

2. The process according to claim 1 in which the latex blend is compounded, foamed by whipping, gelled and cured to produce an improved latex foam having a density of about 0.05 to 0.3 gram per cubic centimeter.

3. The process according to claim 1 in which said rubber latex (A) is a butadiene-styrene copolymer latex and said latex (B) is a butadiene-methacrylonitrile copolymer containing 25-45 weight percent of methacrylonitrile.

4. The process of claim 1, wherein the latex (A) is selected from the group consisting of natural rubber latex, a butadienestyrene copolymer latex and a polybutadiene latex.

5. The process of claim 1, wherein the latex (B) is a butadiene-methacrylonitrile copolymer latex having a total solids content of at least about 60% by weight.

6. The process of claim 1, wherein the copolymer of latex (B) contains 25 to 45 weight percent of methacrylonitrile.

References Cited
UNITED STATES PATENTS

| | | | |
|---|---|---|---|
| 2,472,054 | 5/1949 | McFadden | 260—2.5L |
| 2,484,434 | 10/1949 | Van Buskirk | 260—2.5L |
| 2,568,457 | 9/1951 | Meyer | 260—2.5L |
| 2,567,988 | 9/1951 | Bethe | 260—2.5L |
| 2,643,233 | 6/1953 | Bennett et al. | 260—2.5L |
| 3,080,334 | 3/1963 | Kolaczewski et al. | 260—2.5L |

MURRAY TILLMAN, Primary Examiner

M. FOELAK, Assistant Examiner

U.S. Cl. X.R.

204—159.14, 159.2, 160.1; 260—5, 23.7, 29.7, 894